United States Patent
Christenson

(10) Patent No.: US 7,508,301 B2
(45) Date of Patent: Mar. 24, 2009

(54) TIRE MONITORING SYSTEM AND METHOD

(75) Inventor: Keith Albert Christenson, Canton, MI (US)

(73) Assignee: Lear Corporation, Southfield, MI (US)

(*) Notice: Subject to any disclaimer, the term of this patent is extended or adjusted under 35 U.S.C. 154(b) by 241 days.

(21) Appl. No.: 11/467,693

(22) Filed: Aug. 28, 2006

(65) Prior Publication Data

US 2008/0055062 A1 Mar. 6, 2008

(51) Int. Cl.
*B60C 23/02* (2006.01)

(52) U.S. Cl. .............. 340/442; 340/444; 340/445; 340/446; 340/447; 340/449; 73/146; 73/146.5; 116/34 R; 701/29

(58) Field of Classification Search .............. 340/442, 340/444, 445, 446, 447, 449, 426.33; 73/146, 73/146.2, 146.3, 146.5; 116/34 R; 701/29, 701/30

See application file for complete search history.

(56) References Cited

U.S. PATENT DOCUMENTS

| | | | |
|---|---|---|---|
| 6,204,758 B1 | 3/2001 | Wacker et al. | |
| 6,259,361 B1 * | 7/2001 | Robillard et al. | 340/447 |
| 6,362,731 B1 | 3/2002 | Lill | |
| 6,369,703 B1 | 4/2002 | Lill | |
| 6,668,636 B2 | 12/2003 | Nantz et al. | |
| 6,691,567 B2 | 2/2004 | Walker et al. | |
| 6,693,522 B2 | 2/2004 | Tang et al. | |
| 6,788,193 B2 * | 9/2004 | King et al. | 340/447 |
| 6,897,770 B2 | 5/2005 | Lill | |
| 6,914,523 B2 | 7/2005 | Munch et al. | |
| 2002/0067285 A1 | 6/2002 | Lill | |
| 2003/0071723 A1 | 4/2003 | Tang et al. | |
| 2003/0164030 A1 | 9/2003 | Walker et al. | |
| 2003/0164031 A1 | 9/2003 | Nantz et al. | |
| 2003/0179085 A1 | 9/2003 | Ghabra et al. | |
| 2003/0197603 A1 | 10/2003 | Stewart et al. | |
| 2004/0095233 A1 | 5/2004 | DeZorzi et al. | |
| 2004/0172179 A1 | 9/2004 | Miwa | |
| 2006/0044125 A1 | 3/2006 | Pierbon | |
| 2006/0132356 A1 | 6/2006 | Dulac | |
| 2006/0142911 A1 | 6/2006 | Allard et al. | |

FOREIGN PATENT DOCUMENTS

| | | |
|---|---|---|
| EP | 1339553 | 9/2003 |
| GB | 2385927 A | 9/2003 |
| GB | 2385928 | 9/2003 |
| GB | 2385931 A | 9/2003 |
| GB | 2387032 A | 10/2003 |
| GB | 2415052 | 12/2005 |
| WO | 02090136 | 11/2002 |

* cited by examiner

*Primary Examiner*—Hung T. Nguyen
(74) *Attorney, Agent, or Firm*—Brooks Kushman P.C.

(57) ABSTRACT

A tire monitoring system for a vehicle having tires determines if two tires share a same side of the vehicle based on a state of each of the two tires. In at least one embodiment, a first output signal indicative of a state of a first tire and a second output signal indicative of a state of a second tire are transmitted and received. A determination as to whether the first tire and the second tire are on a same side of the vehicle based on the state of the first tire and the state of the second tire is made.

4 Claims, 3 Drawing Sheets

TIRE MONITORING SYSTEM AND METHOD

BACKGROUND OF THE INVENTION

1. Field of the Invention

The invention relates to tire monitoring systems and methods.

2. Background

Current tire pressure monitoring systems that identify tire position on a vehicle may include four low frequency initiators (LFIs). Each of the LFIs communicates with a respective wheel sensor. An electronic control unit (ECU) may determine the position of a particular wheel sensor, and thus a particular tire, by commanding an LFI, whose position is known, to transmit an initiation signal for its wheel sensor. When the wheel sensor receives the initiation signal, it transmits a response signal for the ECU. The response signal has information the ECU can use to distinguish it from other signals received from the other wheel sensors. The ECU can then sequentially command the other LFIs, whose positions are also known, to similarly transmit an initiation signal for their respective wheel sensors. Based on the received response signals and the known positions of the LFIs, the ECU can determine the location of the respective wheel sensors, and thus the location of the respective tires.

SUMMARY

In at least one embodiment, the invention takes the form of a vehicle tire monitoring system for use in a vehicle having tires. The system includes a first sensor arrangement located at a first tire of the vehicle. The first sensor arrangement transmits a first output signal indicative of a state of the first tire. The system also includes a second sensor arrangement located at a second tire of the vehicle. The second sensor arrangement transmits a second output signal indicative of a state of the second tire. The system further includes a receiver arrangement. The receiver arrangement receives the first output signal and the second output signal and determines if the first tire and the second tire are on a same side of the vehicle based on the state of the first tire and the state of the second tire.

In at least one embodiment, the invention takes the form of a vehicle tire monitoring system for use in a vehicle having tires. The system includes a first sensor arrangement located at a first tire of the vehicle. The first sensor arrangement transmits a first output signal indicative of a state of the first tire including a direction of rotation of the first tire. The system also includes a second sensor arrangement located at a second tire of the vehicle. The second sensor arrangement transmits a second output signal indicative of a state of the second tire including a direction of rotation of the second tire. The system further includes an initiator arrangement that produces an initiation signal. The first sensor arrangement, in response to the producing of the initiation signal by the initiator arrangement, transmits the first output signal.

In at least one embodiment, the invention takes the form of a method of vehicle tire monitoring for use in a vehicle having tires. The method includes transmitting a first output signal indicative of a state of a first tire and transmitting a second output signal indicative of a state of a second tire. The method also includes receiving the first output signal and the second output signal. The method further includes determining if the first tire and the second tire are on a same side of the vehicle based on the state of the first tire and the state of the second tire.

While exemplary embodiments in accordance with the invention are illustrated and disclosed, such disclosure should not be construed to limit the claims. It is anticipated that various modifications and alternative designs may be made without departing from the scope of the invention.

DETAILED DESCRIPTION

Figure 1:
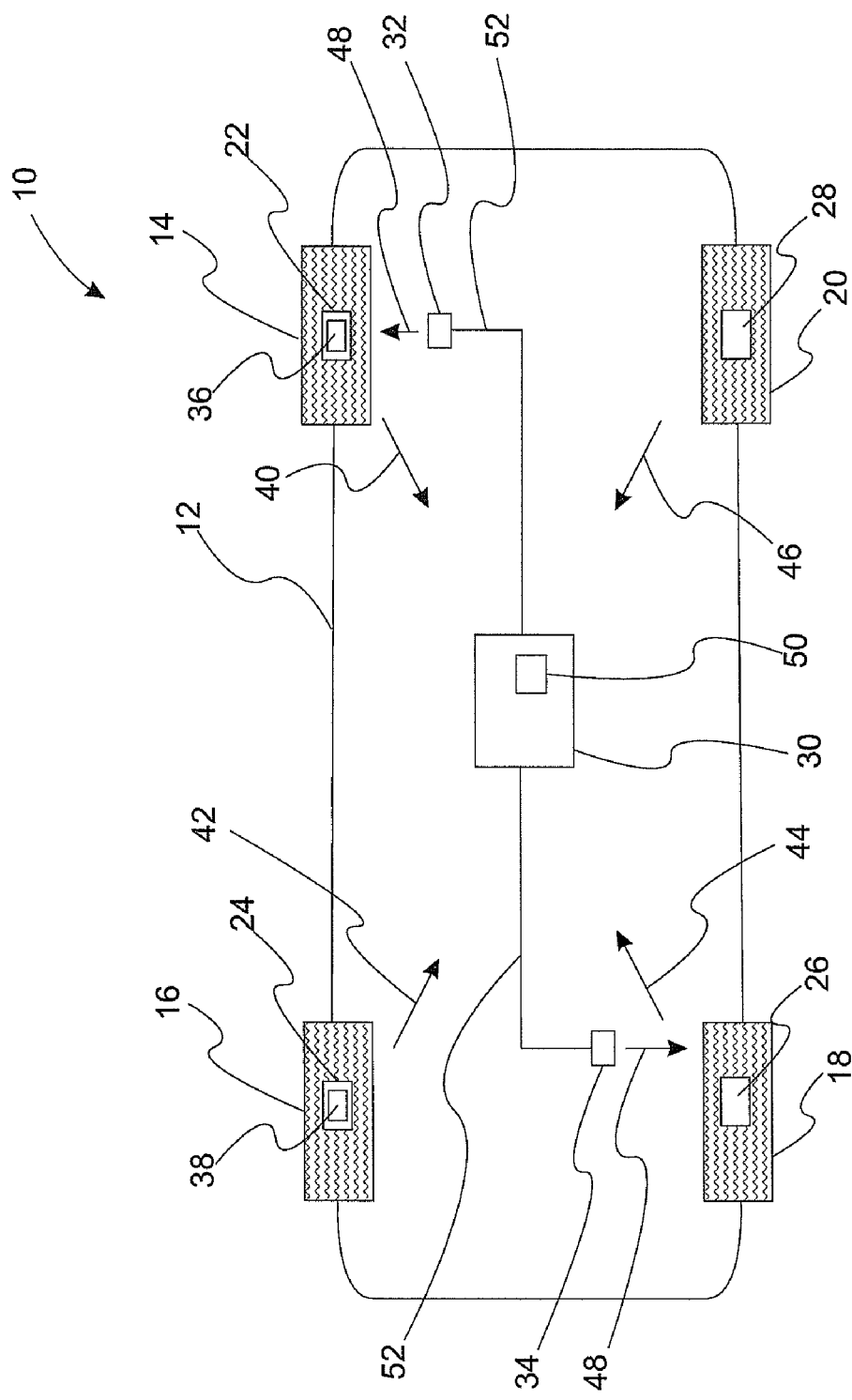
FIG. 1 shows a system in accordance with an embodiment of the invention.

FIG. 1 shows vehicle tire monitoring system 10 for vehicle 12 having tires 14, 16, 18, and 20. System 10 includes tire pressure sensor modules 22, 24, 26, and 28, receiver 30, and electromagnetic field generators 32, 34.

Modules 22, 24, e.g., wheel electronic sensors or tire pressure sensor units, include accelerometer sensors 36, 38, e.g., accelerometers, respectively. Sensors 36, 38 sense the direction of rotation of tires 14, 16 respectively.

Modules 22, 24 transmit radio signals 40, 42 respectively. Signals 40, 42 include the direction of rotation information for tires 14, 16 respectively. Other information, e.g., tire pressure or module identification, may be included with signals 40, 42. Modules 22, 24 may transmit signals 40, 42 periodically, e.g., once per minute if vehicle 12 is moving and once every three hours if vehicle 12 is not moving. The preceding example transmission strategy conserves battery life. Any suitable transmission strategy, however, may be used. Modules 22, 24 may also transmit signals 40, 42 in response to receiving initiation signal 48 as will be explained in detail below. Signals 40, 42 may have a frequency of, for example, 315 megahertz. Modules 26, 28 are configured similarly to modules 22, 24 and similarly transmit radio signals 44, 46 respectively.

Receiver 30, e.g., a control unit including an RF receiver, a micro controller, drivers to drive a display and actuate low frequency initiators, and a circuit to interface with a vehicle data bus, receives signals 40, 42, 44, and 46, extracts the direction of rotation information, and determines which of tires 14, 16, 18, and 20 are on a same side of vehicle 12 based on a comparison of the direction of rotation information. Tires 14, 16 will have the same direction of rotation. Tires 18, 20 will have the same direction of rotation.

Electromagnetic field generators 32, 34, e.g., low frequency initiators, are located on opposite sides of vehicle 12 and proximate the modules with which they are to communicate, e.g., generators 32, 34 are located proximate modules 22, 26 respectively. The location of generators 32, 34, e.g., driver side front and passenger side rear, is stored within memory 50 of receiver 30. Generators 32, 34 communicate with receiver 30 via, for example, Car Area Network (CAN) 52. Generators 32, 34 transmit initiation signals 48 in response to a command from receiver 30. Signals 48 may have a low frequency of, for example, 125 kilohertz.

Receiver 30 may command generator 32 to transmit signal 48. The relatively low power associated with signal 48 will limit the ability of generator 32 to communicate with modules other than those in its proximity. In response to receiving signal 48, module 22 transmits signal 40. If receiver 30 receives signal 40 within a predetermined period of time, e.g., 6 seconds, after commanding generator 32 to transmit signal 48, receiver 30 will determine that generator 32 is located proximate the module that transmitted signal 40, i.e., module 22. The predetermined period of time depends on the polling rate, e.g., low frequency polling rate, of module 22. As the polling rate of module 22 increases, the predetermined period of time may decrease. Because the location of generator 32 is known, e.g., driver side front, the location of the module in communication with generator 32, i.e., module 22, is known, e.g., driver side front. As explained above, receiver 30 determined that tires 14, 16 are on the same side of vehicle 12. Receiver 30 can thus determine that module 24 is located on driver side rear. Receiver 30 may similarly command generator 34. Determining the location of modules in communication with generators 32, 34 may be done before or simultaneously with determining which tires share a side of vehicle 12.

Upon vehicle 12 ignition, receiver 30 may command generators 32 to transmit signals 48. As such, the location of the tire that is associated with generator 32, i.e., tire 14, is known. Receiver 30 then waits for vehicle motion before learning the location of the tire not associated with generator 32.

Figure 2:
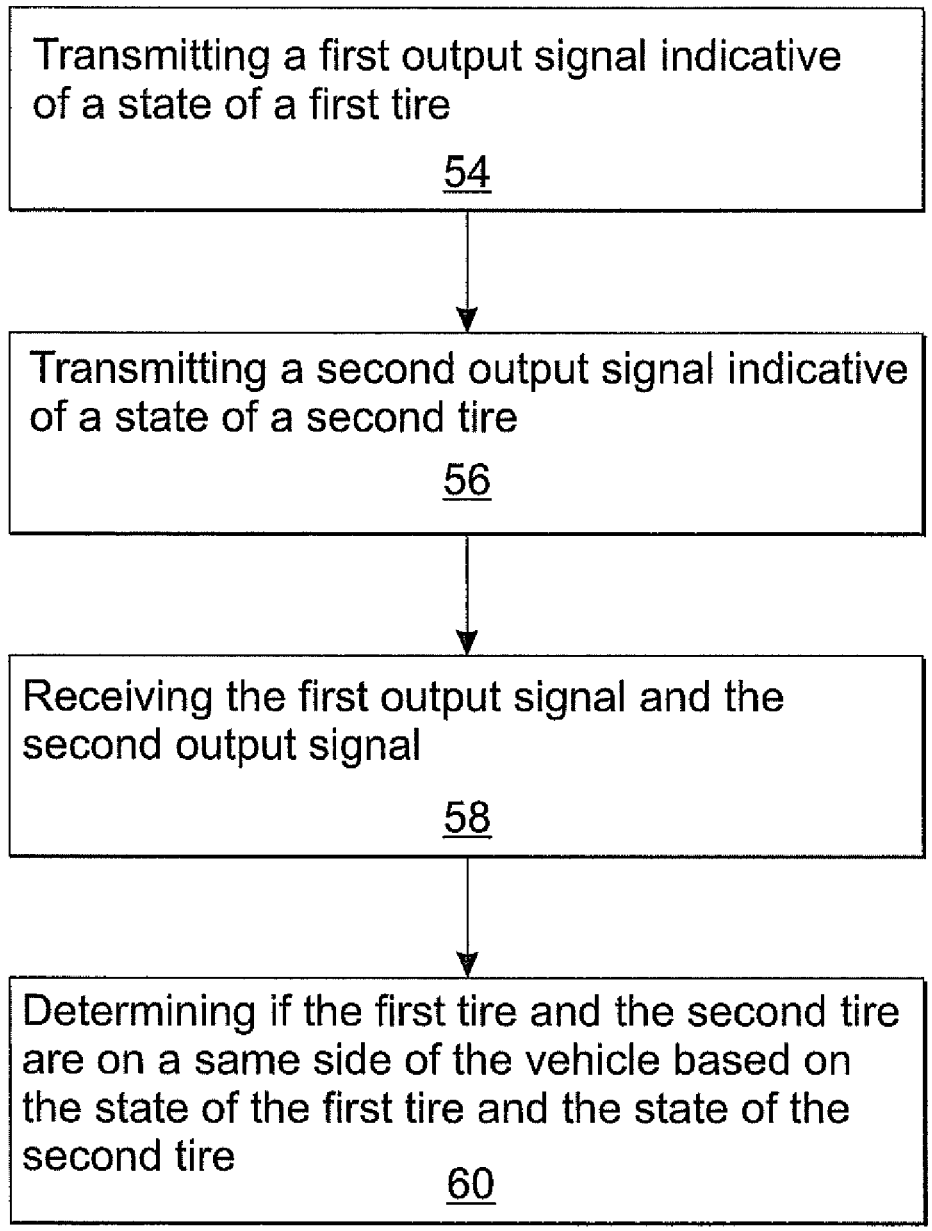
FIG. 2 shows a method in accordance with an embodiment of the invention.

FIG. 2 shows a method of the invention. At step 54 a first output signal indicative of a state of a first tire is transmitted. At step 56, a second output signal indicative of a state of a second tire is transmitted. At step 58, the first output signal and the second output signal are received. At step 60, a determination is made if the first tire and the second tire are on a same side of the vehicle based on the state of the first tire and the state of the second tire.

Figure 3:
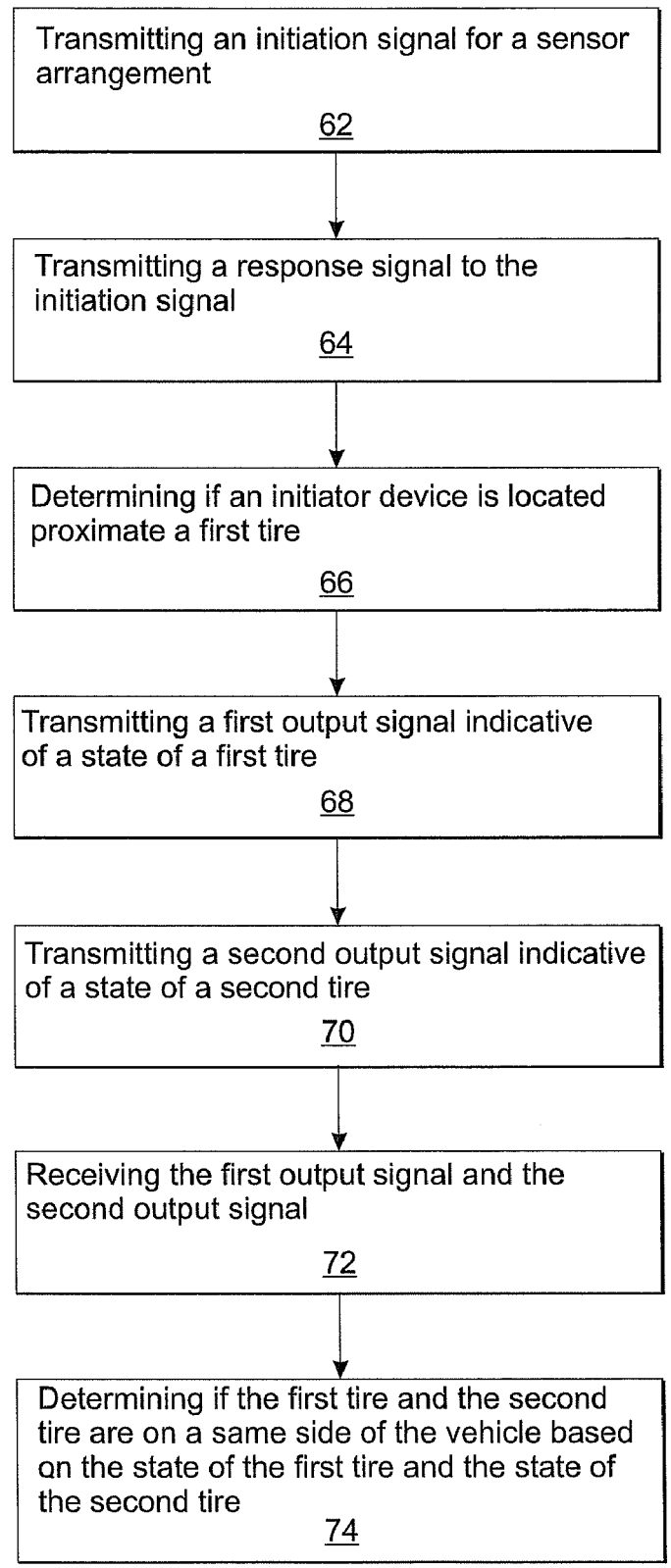
FIG. 3 shows a method in accordance with an embodiment of the invention.

FIG. 3 shows a method of the invention. At step 62, an initiation signal for a sensor arrangement is transmitted. At step 64, a response signal to the initiation signal is transmitted. At step 66, a determination is made if an initiator arrangement is located proximate a first tire. At step 68, a first output signal indicative of a state of a first tire is transmitted. At step 70, a second output signal indicative of a state of a second tire is transmitted. At step 72 the first output signal and the second output signal are received. At step 74, a determination is made if the first tire and the second tire are on a same side of the vehicle based on the state of the first tire and the state of the second tire.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle tire monitoring system for use in a vehicle having two front and two rear tires, the system comprising:
    no more than two initiator arrangements, one of the initiator arrangements located adjacent to one of the front tires and configured to produce a first initiation signal, the other of the initiator arrangements located adjacent to one of the rear tires and configured to produce a second initiation signal;
    no more than two sensor arrangements, one of the sensor arrangements located at one of the tires of the vehicle and configured to transmit a first output signal indicative of a direction of rotation of the one tire in response to receiving the first or second initiation signal, the other of the sensor arrangements located at another one of the tires of the vehicle and configured to transmit a second output signal indicative of a direction of rotation of the another one tire in response to receiving the first or second initiation signal; and
    a receiver arrangement configured to cause the initiator arrangements to produce the initiation signals and to determine a position of each of the front and rear tires based on (i) whether the receiver arrangement receives the first and second output signals within a predetermined period of time after the initiation signals have been produce and (ii) the direction of rotation of the first and second tires.

2. The system of claim 1 wherein the one sensor arrangement transmits the first output signal periodically and the other sensor arrangement transmits the second output signal periodically.

3. The system of claim 1 wherein each of the initiator arrangement comprises a low frequency initiator.

4. A method of vehicle tire monitoring for use in a vehicle having four tires comprising:
    transmitting first and second initiation signals;
    transmitting a first output signal indicative of a direction of rotation of one of the four tires in response to receiving one the first and second initiation signals;
    transmitting a second output signal indicative of a direction of rotation of another one of the four tires in response to receiving the other of the first and second initiation signals; and
    determining a position of each of the four tires based on (i) whether the receiver arrangement receives the first and second output signals within a predetermined period of time after the initiation signals have been produced and (ii) the direction of rotation of the one tire and the another one tire.

* * * * *

UNITED STATES PATENT AND TRADEMARK OFFICE
CERTIFICATE OF CORRECTION

PATENT NO. : 7,508,301 B2
APPLICATION NO. : 11/467693
DATED : March 24, 2009
INVENTOR(S) : Keith Albert Christenson Page 1 of 1

It is certified that error appears in the above-identified patent and that said Letters Patent is hereby corrected as shown below:

Column 4, Line 27, Claim 1:

Delete "produce" and insert -- produced --.

Signed and Sealed this

Thirtieth Day of June, 2009

JOHN DOLL
*Acting Director of the United States Patent and Trademark Office*